June 2, 1942.  R. B. HARTMAN  2,284,898
STRUCTURAL SYSTEM
Filed Nov. 29, 1939   4 Sheets-Sheet 1

Rudolph B. Hartman
INVENTOR.
ATTORNEY.

June 2, 1942.  R. B. HARTMAN  2,284,898
STRUCTURAL SYSTEM
Filed Nov. 29, 1939  4 Sheets-Sheet 2

Rudolph B. Hartman
INVENTOR.

BY Elwin A. Andrus
ATTORNEY.

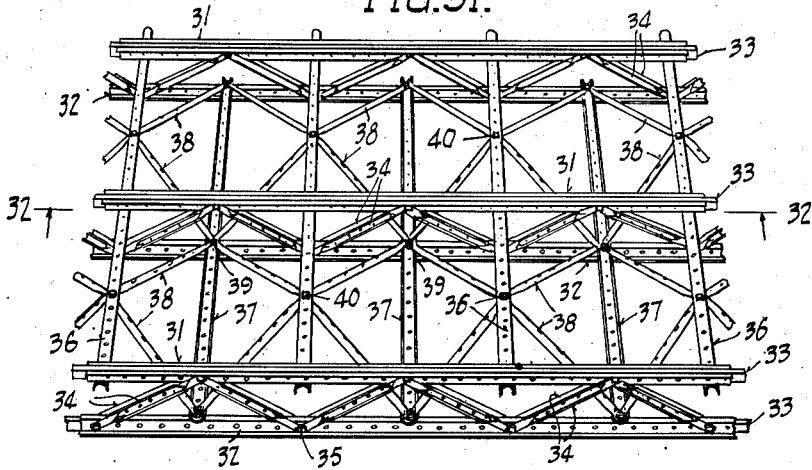
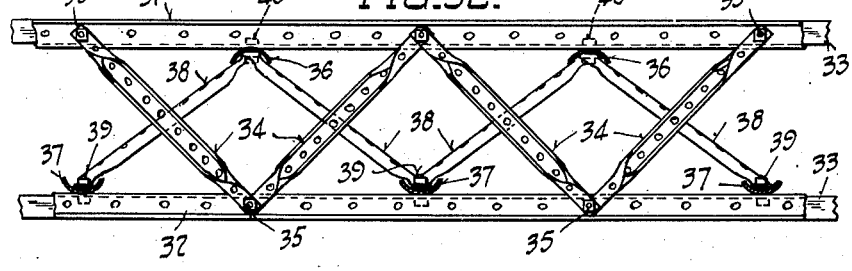
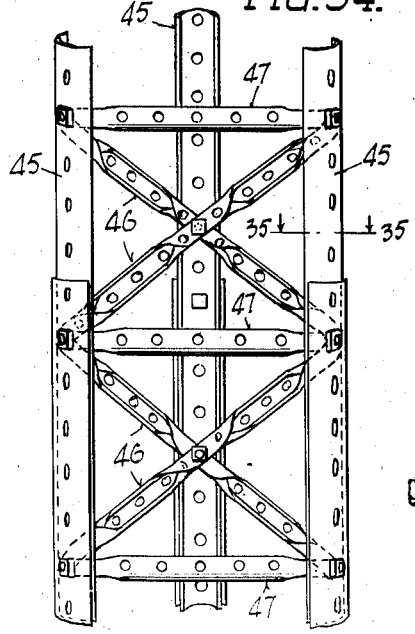
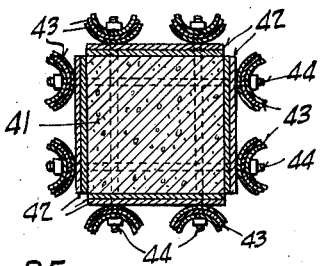
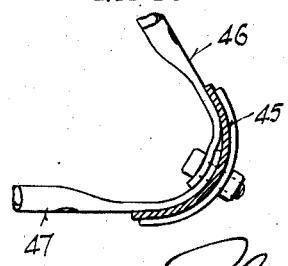

June 2, 1942.　　　　R. B. HARTMAN　　　　2,284,898
STRUCTURAL SYSTEM
Filed Nov. 29, 1939　　　　4 Sheets-Sheet 4
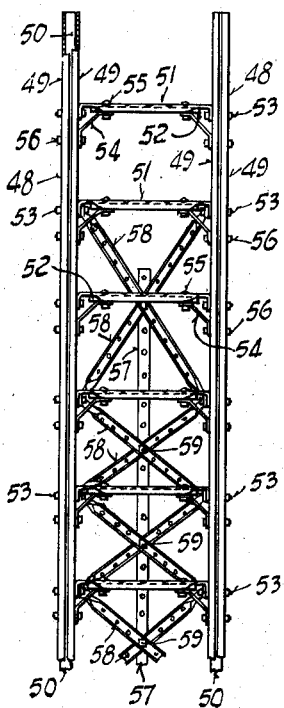
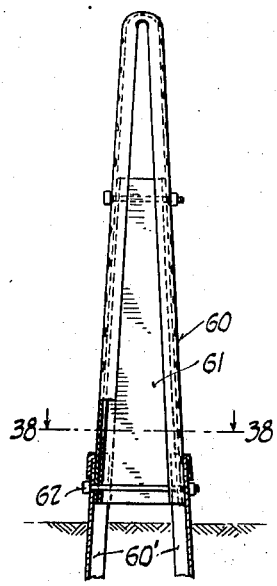
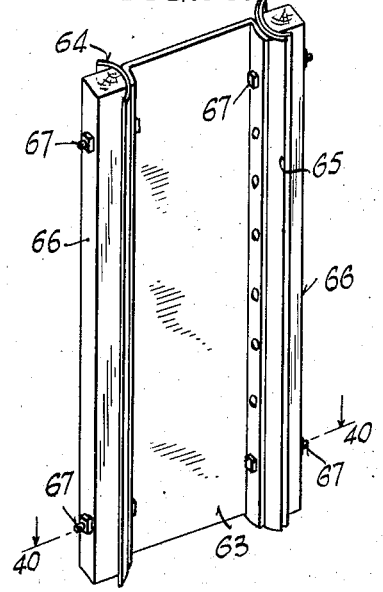
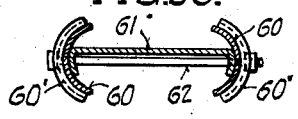
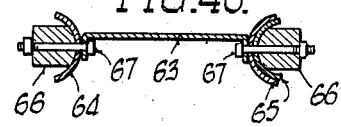
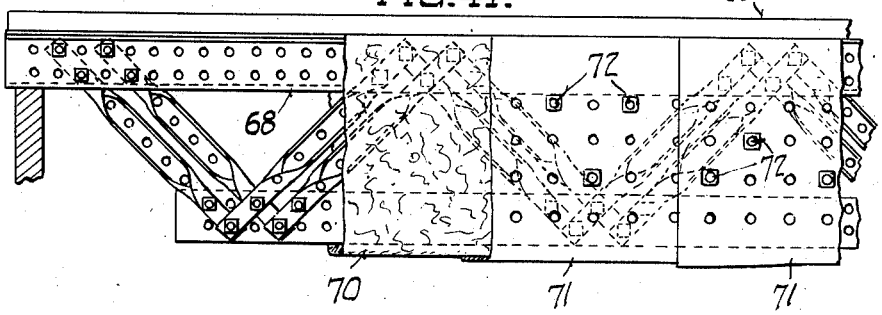
Rudolph B. Hartman
INVENTOR.
BY
ATTORNEY.

Patented June 2, 1942

2,284,898

UNITED STATES PATENT OFFICE 2,284,898

STRUCTURAL SYSTEM

Rudolph B. Hartman, Hartland, Wis.

Application November 29, 1939, Serial No. 306,619

4 Claims. (Cl. 189—34)

This invention relates to structural systems and structural units for building construction.

Steel construction is widely used in large structures such as bridges, office buildings, factories, and warehouses, and in many smaller structures as well, but, despite its many advantages, it is still not employed to its maximum extent because of the rather specialized methods and equipment required for its erection on the job.

An object of the present invention is to provide standardized, interchangeable, structural units which can be readily and cheaply fabricated from sheets of steel or other suitable metal, which require no machine work at the point of erection prior to assembly, and which are adapted for rapid assembly into trusses or other forms which can serve as beams, joists, columns, poles, posts, or other load carrying members which are of lighter weight than wood joists or rolled structural shapes commonly used for such purposes.

Another object of the invention is to provide structural units pierced with uniformly spaced holes to facilitate the splicing of similar units or attachment to dissimilar units by means of bolts or rivets to form a continuous structure of much greater extent that the individual units.

Another object of the invention is to provide structural units with uniformly spaced holes which serve to measure distances along the units and which make it unnecessary to employ templates or other means for laying out the holes needed for attachment to other members.

Another object of the invention is to have one set of units which can be assembled to form structures which will replace wood joists, steel joists, rolled sections and trusses, and which will cover a wide range of length, depth, and carrying capacity.

Another object of the invention is to provide standardized units of which two or more can be superimposed and used together in laminations to reinforce those parts of a structure in which additional strength is required.

Another object of the invention is to provide structural units which can be made and stocked in a relatively small number of standard sizes and shapes and which can be assembled in different combinations, to form trusses, flooring and roofing systems braced longitudinally and transversely of the direction of the primary chord system, towers, scaffoldings, and other structures of a great variety of size and carrying capacity.

Another object of the invention is to provide units adapted for use in two-way construction to provide light, strong, and rigid structures for the support of floors and roofs.

Another object of the invention is to provide structures which are readily and economically fireproofed and insulated.

Another object of the invention is to provide structural units which are individually of light weight and which can, therefore, be shipped and erected without any need for special trucks, cars, or cranes for handling heavy weights.

A further object of the invention is to provide structural units and a system of construction such as to permit the ready disassembly of a completed structure into its constituent units, which are thus salvaged without any loss for subsequent use in either the same or a different kind of structure.

Further objects of the invention will be clear from the following detailed description and the accompanying drawings in which:

Fig. 1 is a side elevation of part of a truss constructed in accordance with one embodiment of the invention;

Fig. 2 is a section on the line 2—2 of Fig. 1;

Fig. 3 is a section on the line 3—3 of Fig. 1;

Fig. 4 is a side elevation of part of a modified form of truss;

Fig. 5 is a section on the line 5—5 of Fig. 4;

Fig. 6 is a section illustrating the reinforcement of chord members such as those used in Fig. 4;

Fig. 7 is a side elevation of a roof truss;

Figure 23:
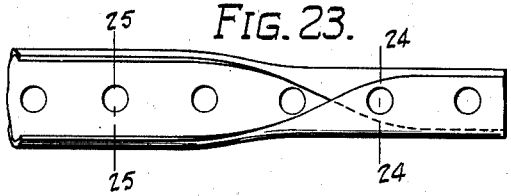
Figures 24, 25:
Figure 26:
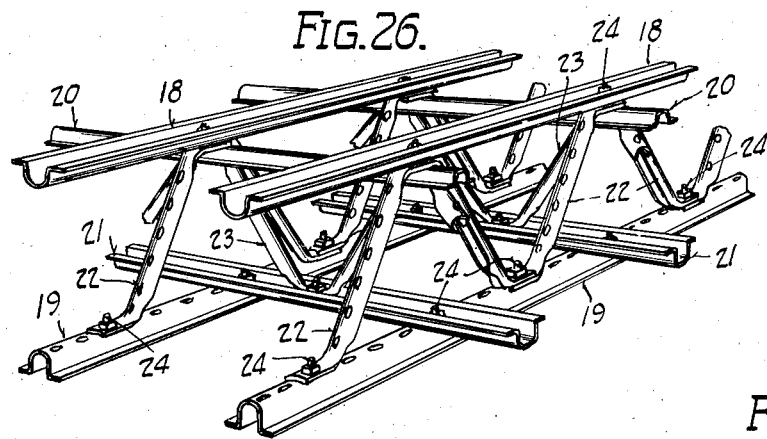
Figure 27:
Figure 28:
Figure 29:
Figure 30:
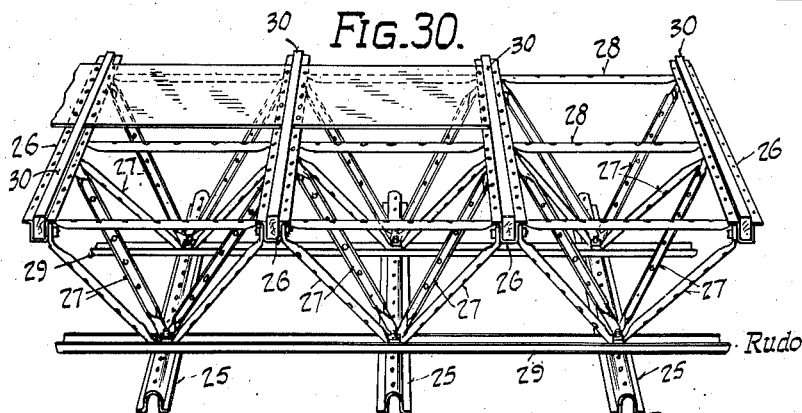

Figs. 8 to 22 inclusive are sections through various shapes adapted for use as structural units;

Fig. 23 is a plan view of the end of a diagonal member;

Fig. 24 is a section on line 24—24 of Fig. 23;

Fig. 25 is a section on line 25—25 of Fig. 23;

Fig. 26 is a view in perspective showing structural units combined into a structure for the support of floors or roofs;

Fig. 27 is a side elevation of a continuous unit to be used for the diagonals of a truss;

Figs. 28 and 29 are sections on lines 28—28 and 29—29 of Fig. 27 respectively;

Fig. 30 is a perspective view of a modified form of structure for the support of floors or roofs;

Fig. 31 is a perspective view of still another modification of a structure for the support of floors or roofs;

Fig. 32 is a side view of the same modification, partly in elevation and partly in section on the line 32—32 of Fig. 31;

Fig. 33 is a section through a column constructed in accordance with the invention;

Fig. 34 is a perspective view of a tower;

Fig. 35 is a section on the line 35—35 of Fig. 34;

Fig. 36 is an elevation of a ladder;

Fig. 37 is an elevation of a fence post;

Fig. 38 is a section on line 38—38 of Fig. 37;

Fig. 39 is a view in perspective of a solid web stud;

Fig. 40 is a section on line 40—40 of Fig. 39; and

Fig. 41 is a perspective view showing the application of fireproofing material to a truss.

In accordance with this invention, structural units of standardized shapes and sizes are fabricated by forming sheet metal of suitable thickness. For most applications, plain carbon steel will be suitable, but aluminum can be used when extreme lightness is desired, corrosion resistant steel or alloys when corrosion is an important consideration, or other metals for special conditions. When steel is used its surface can be protected against corrosion by galvanizing, painting, or other means well known in the art.

The units are provided with a series of uniformly spaced holes for attachment to each other and to units of a different kind. The size and spacing of the holes may be modified without departing from the spirit of the invention, but for many applications it will be found that holes for three-eighths (⅜) inch bolts spaced on one (1) inch centers will be suitable.

The structural units will comprise units for use in the upper and lower chords of trusses, units to serve as diagonal members, units for bracing, flat plates, channels and angles provided with uniformly spaced holes to serve as connectors for securing different units to each other or as spacers, and such other specialized shapes as may be needed. Other units with holes spaced on a different pattern from that used in the main members may be provided for making splices between the members in the top or bottom chord of a truss. If the holes in the members to be joined are spaced on one inch (1″) centers, for example, the units for joining them will have a series of holes spaced on one inch (1″) centers to permit their attachment to one of the members to be joined by a plurality of bolts or rivets. The connecting units will also have a second series of holes on one inch (1″) centers for attachment to the other member to be joined. Between these two series of holes a gap is left which is not an integral number of inches. By providing a series of different standardized splicing units with gaps which are 1 1/16 inches, 1 2/16 inches, and so on up to 1 15/16 inches, it is accordingly possible to adjust the total length covered by two joining members to one-sixteenth of an inch. The latitude so obtained can be used to make the upper chord somewhat longer than the lower chord to impart an initial camber to the beam or truss so that when loaded it will be substantially straight. The splicing members may also be used to join the upper and lower chords of trusses in which the total length is not an integral number of panel lengths. The length adjustment in this case can also be made by using a center panel which consists of a solid plate in which horizontal and vertical holes have been pierced at appropriate distances.

All units can be drilled or punched in a metal working shop and stamped or pressed or otherwise formed into shape so that when delivered to the job no further work is needed beyond assembly into the desired structure.

The structural units are preferably formed from sheet metal of substantially uniform thickness since this is readily available in different gauges and can be formed into a great variety of shapes. It is to be understood, however, that the units can also be formed from strips which are not of uniform thickness across their width, as a sheet with a raised ridge or ridges running along the line or lines on which the holes are spaced. This will provide a greater thickness of metal for bearing against the bolts or rivets which fasten different units together and may be advantageous at times. Other sections of non-uniform thickness can be used where it is desired to have the edges thicker than the rest of the section. In general, however, it is preferred to use sheet metal of substantially uniform thickness because of its greater flexibility and because it can be rolled without special rolls.

Referring to the drawings, and in particular to Fig. 1, a part of a truss is shown which is composed of an upper chord 1, and a lower chord 2, united by diagonal members 3 which are fastened to the upper and lower chord by bolts 4. In the embodiment illustrated in Fig. 1, the upper and lower chords have a section approximating that of a trough, as shown in Fig. 2.

In a beam or truss which carries a load uniformly distributed over its length, the shear is greatest at the ends, while the bending moment is greatest at the center. In a center loaded beam the shear is uniform over each half of the beam while the bending moment is greatest at the center; and in a beam carrying a number of concentrated loads, either with or without a uniformly distributed load, the shear and bending moments at different sections follow still another pattern. Consequently the same weight of metal is not required at all points throughout the length of the beam or truss in order that it may carry its load with safety.

This invention makes it possible to apply metal where it is needed to carry the load and to dispense with it where it is unnecessary and serves only to increase the dead weight of the structure. Thus, in Fig. 1, three diagonals are shown at the left end of the truss to carry the vertical shear which is large at the end of a uniformly loaded beam, and a smaller number nearer the center where the vertical shear becomes less. Furthermore, the upper and lower chords of the truss can be reinforced by nesting several units together. Since the units all have a common spacing for the holes 5, the holes in superimposed or nested units all coincide and serve for attachment to the diagonals by means of bolts. Reinforcement of the chord sections is applied where the bending moment is greatest and this will be towards the center of the truss for many conditions of loading. Reinforcement at the ends of the upper chord is also necessary where the truss is used as a hung joist with the upper chord resting on a support 6. Additional chord units are nested one within another as shown in Fig. 3 to provide extra strength to carry the bearing load imposed on the upper chord. It is also clear that where the upper chord projects beyond the last panel point of the truss to rest upon support 6, it must be considered as a unit in itself and not as a part of the whole truss, and must have sufficient strength to take care of the bending moment imposed by the circumstance that the support does not coincide with the end panel point. The reinforcement applied at the end of the upper chord should be extended to the panel point next beyond the one at the end, after which it can be omitted until the increase in the bending moment on the truss as a whole requires reinforcement of the chord. With this system of construction it is possible to concentrate metal where it is needed to carry stress instead of to distribute it uniformly, as in rolled sections in which no small part of the metal is stressed to a much lower value than it will stand. This results in a considerable saving in weight.

This system is also well adapted to rapid and easy assembly on the job since all holes are exactly prepared and equally spaced and it is only necessary to bolt the different units together. The individual units are small and light in weight and no expensive and heavy machinery is required to handle them.

A relatively small number of different standardized shapes and sizes can be assembled in a wide variety of different combinations. The structural units for chords can be used in trusses of different depth by employing diagonals of greater or lesser length, or by using diagonals of the same length but inclined at different angles to the chords. The trusses so fabricated can advantageously be used as beams and joists instead of the rolled sections now employed for this purpose.

Another embodiment of the invention is illustrated in Figs. 4 and 5 in which the structural units used for the chords 7 and 8 have a different shape from those used in the preceding embodiment and the diagonals are bolted to the sides instead of to the top or bottom of a chord. A spacer 10, which may be a channel with holes in its flanges, is provided to keep the sides of the chords 7 and 8 from being pulled together by the long bolts 11 used to fasten the diagonals to the chords. In the center of a truss constructed as shown in Fig. 4, reinforcement consisting of trough shaped members 9 can be applied in the manner shown in Fig. 6 to take care of the heavy bending moment at or near the center of the span. When a truss of this kind is to be hung with the upper chord resting on a support 6, each end of the upper chord is reinforced by channel members 12 and 13 which extend from each end to the panel point next beyond the one at the end.

The structural units used for the chords 7 and 8 in the truss of Fig. 4 are supplied with two rows of holes 5. These rows may be spaced one inch apart with the holes in each row uniformly spaced one inch apart. If the holes in the diagonal members are spaced the square root of two inches apart, then the diagonals and chords can be readily assembled as shown in Fig. 4 to give a truss in which the diagonals are inclined at an angle of forty-five degrees, and in which more than one bolt is used to connect each diagonal to a chord. It is apparent that trusses with diagonals at other angles can be readily produced if the holes in the chord and diagonal members are suitably spaced and if the two rows of holes in the chord are not arranged one above the other. If the holes in the chord members are vertically one above the other and are spaced on one inch centers in each direction, a two to one or one to two slope of the diagonals will require that the holes in the diagonals be the square root of five inches apart. A three to two, or two to three slope of the diagonals will require that the spacing of the holes in the diagonals be the square root of thirteen inches.

While the trusses previously shown have parallel upper and lower chords, the units of this invention are not limited to this type of structure. A bridge or roof truss such as shown in Fig. 7 can also be built up from the units with lower chord 14, upper chords 15 and diagonals 16. An adjusting member may be provided as an extension on some of the diagonal members.

While the chord sections shown in Figs. 1 to 6 inclusive are found to be very suitable for carrying this invention into practice, this invention is not limited to the use of these particular forms. Other sections which are adapted to be used for chords are shown in Figs. 8 to 22, inclusive, and still others can be used. The structural units made with these sections are provided with one, two, three or even more rows of holes for attachment to other units. It will be seen that a number of similar units with a trough shaped section as shown in Fig. 2, or with sections such as those shown in Figs. 10, 12, 13, 14, and 18 can be nested together and that the bolt holes in all units will coincide or can be made to coincide by longitudinal motion of one unit over another. This facilitates the building up of a composite unit of any desired thickness and strength since bolts or rivets through the holes will fasten all the units together. Units with a Z section as shown in Fig. 15 can be tightly nested together, but while the holes in the different units can be made to coincide in a longitudinal direction, they will be displaced laterally. This can be remedied by drilling the holes at a different position in each unit that is to be nested with another, or by bending and drilling nested blanks in groups, but in general it is preferred to make the units of such cross section that a plurality of identical units can be nested together with complete coincidence of the bolt or rivet holes.

The structural units used for diagonals are shown in more detail in Figs. 23 to 25 in which Fig. 23 is a plan view of one end of a diagonal such as that used in the truss shown in Fig. 4. Towards its mid-section the flat sheet used to make the diagonal member is bent around on itself as shown in Fig. 25 to stiffen the diagonal against buckling when it is used in compression. At the ends, the flat sheet is bent sharply over on itself as shown in Figs. 23 and 24 to provide three overlapping thicknesses of metal through which the bolt holes pass. It will be apparent to those skilled in the art, that the flat sheet used to make the diagonal unit can be folded on itself so as to produce two, three, four, six, or even more overlying layers of metal through which the bolt holes pass. The object of so folding the diagonal members at the ends is to provide a greater surface for bearing against the bolts, and also to stiffen the diagonal member where it is flattened at the ends for greater convenience of attachment to the chord. The diagonal member illustrated in Figs. 23 to 25 is for attachment to the sides of upper and lower trusses, but can be bent a little to the left of section line 24—24 of Fig. 23 to form a diagonal suitable for connection to the bottom of an upper chord or the top of a bottom chord.

The structural elements of the invention are not confined in their utility to the production of trusses such as those described but can also be combined into two-way structures which are particularly suitable for the support of floors and roofs. One embodiment of such a structure is shown in Fig. 26. A primary system of upper and lower chords, 18 and 19, is crossed by a secondary system with upper and lower chords 20 and 21, respectively. Diagonal members 22 and 23 are provided for the primary and secondary chord systems. At a crossing point of upper chords, a single bolt 24 serves to fasten together the upper chords of the primary and secondary systems, and the diagonals as well. The diagonals may be individual units as previously illustrated and described, or they may be fashioned from a single long strip of metal as illustrated in more detail in Figs. 27 to 29. Between the points of attachment to the chord system the sheet is bent into some such sections as that shown in Fig. 28 to stiffen it against buckling under compression. At the points of attachment to the chord system, the metal is desirably bent on itself as shown in Fig. 29 to provide three thicknesses of metal through which the bolt hole passes.

In the floor or roof supporting structure illustrated in Fig. 26, the top chord of the primary system is vertically above the bottom chord of the same system and the same is true for the secondary system of chords. For some purposes the modified structure of Fig. 30 may be preferable. In this the bottom chords 25 of the primary system are not vertically below the upper chords 26, but halfway between them. Diagonal members 27 center the lower chords of the primary system, and at the same time serve as diagonals for the secondary system. The lower chords 29 of the secondary system are trough shaped sections while the upper chords of the secondary system are formed of compression units 28 bolted to the primary chords by bolts which extend through the wooden longitudinal members 30 located within the metal sections for the upper chords of the primary system. Wooden longitudinal members can be used within either or both the upper and lower chords and serve both to transfer thrust from one side of these sections to the other, and as a surface into which nails may be driven for the attachment of a floor, ceiling or roof. Furthermore, it is possible to fireproof the structure by applying sheets of metal, either flat or corrugated, to either the upper or lower chords and bolting them in place. Since the lower chords of both the primary and secondary system are in tension, either or both may be simply flat strips provided with uniformly spaced holes for attachment to the other members, but are shown in the drawing as strips bent into the form of troughs, which provide a stiffer type of tension member, one which is better adapted to the application of fireproofing material, and one which can carry compressive loads should any reversal of stress occur.

Still another modification of a two-way structure is shown in Figs. 31 and 32. The upper and lower chords, 31 and 32, in the primary system of chords, are preferably made from units which have a cross section such as shown in Fig. 20, or any other form which is suitable for attachment of other units to both the sides and to the bottom of the upper chord or to the top of the bottom chord. Longitudinal wooden members 33 are provided in the primary chords to serve as nailing strips. Diagonals 34 are provided in pairs to connect the upper and lower chords of the primary system, one of each pair of diagonals being on one side of a chord and one on the other side, and both being fastened to the chords by a single bolt 35 extending through the chord and the wooden nailing strip within it.

The upper chords 36 of the secondary system cross the upper chords 31 of the primary system mid-way between points of attachment of the diagonals 34 to the upper chord. The lower chords 37 of the secondary system are mid-way between the upper chords of the same system, and consequently cross the lower chords 32 of the primary system mid-way between the points of attachment of the diagonals 34. Diagonals 38, of which four are fastened by a bolt 39 to each crossing point of lower chords, extend from this point to a point on the nearest upper chord of the secondary system halfway between its intersection with two adjacent upper chords of the primary system. The four diagonals coming to this point of the upper chord of the secondary system are fastened to it by a bolt or rivet 40.

Each of the modifications shown can be reinforced with added sections where needed to safely carry the stresses imposed by the load on the floor or roof. These modifications are given by way of example and not of limitation, since other floor or roof supporting structures can be built of structural elements or units within the spirit of the invention. Each of the modifications shown provides a support for a floor or roof which is light in weight, easily assembled in place, and strong and rigid, being securely braced in two directions. Each can be built in wide spans and readily fireproofed with mineral wool or other suitable material.

It is to be noted that in these structures for the support of floors and roofs, the total vertical depth is not equal to the depth of a system of beams plus the depth of a system of joists resting transversely in the beams and serving to transfer floor loads to them. The total depth of the system is used for the bracing of both the primary and secondary system of trusses. By so disposing the primary and secondary systems of trusses in substantially the same horizontal plane, a considerable saving in depth is effected as compared to constructions in which rolled sections are used as beams under other rolled sections which serve as joists. With the constructions shown here, ceilings as well as floors can be made flat over wide spans with no projection due to beams which extend below the general level of the ceiling. It is possible to dispose the upper and lower chords extending in one direction below the respective upper and lower chords extending in the other direction, or, as shown in Fig. 26, the one set of chords may be disposed between the other set.

Furthermore, by employing chords of the cross section shown in Fig. 20, it is possible to build a structure like that in Fig. 26, or like the other modifications, in which the diagonals are joined to the chords on the sides of the latter by horizontal bolts. In this way, by increasing the rows of side holes in the chords more bolts may be employed in attaching each diagonal and a much stronger structure may be built.

Where joists are employed without the two way construction, it is possible to employ applicant's diagonal unit for bridging between the joists, both horizontally between chords and diagonally. This gives a structure of considerably greater strength.

Furthermore, in applicant's construction, where more bolts are needed for greater bearing strength it is possible to employ flat gusset plates pierced with rows of holes suitably spaced for bolting to sides of chords and to diagonal members.

Columns suitable for the support of flooring and roofing systems are readily assembled from structural units. Referring to Fig. 33, which shows a column in section, the core 41 consists of a timber or concrete center to which metal plates 42 and trough shaped sections 43 are fastened by bolts 44. A sufficient number of plates and sections are used to provide a column of any desired strength. A column of this kind is readily tied into a roofing or flooring structure such as those shown previously, and provides with them a strong and rigid system of building construction. The column illustrated is suitable for fireproofing as explained more fully hereinafter. Where fireproofing is not employed, however, it may be desirable to turn the sections 43 inwardly and employ spurs to prevent their flattening under the pressure of the bolts.

Towers, poles, and posts are also easily assembled from the structural units. In the triangular tower illustrated in Fig. 34, the three columns 45 are constituted by structural units of which one is shown in cross section in Fig. 35. Diagonal members 46 unite one column to each of the other two. These two may be connected to each other by horizontal members 47 which will serve as a ladder, or they can be connected by additional diagonal members. Either form of construction will give a light and rigid tower.

Scaffolds of any desired size and height can be made on this job from units similar to the tower or ladder units by bolting two such structures back to back, eliminating the third or rear upright (in Fig. 34 and Fig. 36), and adding a number of horizontal cross pieces between the remaining uprights.

Smaller structures are also readily fabricated from the structural units of this invention. The ladder shown in Fig. 36 has side rails 48, each composed of two longitudinal sheet steel troughs 49 having a cross section similar to that shown in Fig. 12, and a wooden rail 50 of suitable shape to fit within the metal sections 49. The metal rungs 51 are sheet metal shapes substantially similar to those used for the diagonals of trusses and are desirably stiffened by wooden pieces 52 fitting within the metal rungs. The rungs are secured to the rails by bolts 53 and to braces 54 by bolts 55. The braces are secured to the rails by bolts 56 giving a ladder which is at once light in weight and strong. In the ladder illustrated an additional stiffening member 57 extends longitudinally in the back of the ladder and spaced rearwardly thereof to strengthen the ladder. Diagonal members 58 are secured by bolts 53 to the ladder and by bolts 59 to the member 57 and may be of varying length relative to the ladder. For instance, at the center of the ladder the diagonal should extend only a distance of one ladder rung each, whereas near the ends they may extend for two or three rungs. This stiffening member 57 greatly adds to the stiffness of the ladder where long ladders are employed as in fire fighting.

A fence post can be made as shown in Figs. 37 and 38 from a channel section 60 and a trough shaped section 61 bolted to the channel by bolts 62. The channel is desirably made wider at the bottom than the top as this construction gives a stronger post. The post may be supported by curved sheet metal side extensions 60' which are driven into the ground first and to which the post is secured by the bolts 62.

A vertical stud with solid web is shown in perspective Figs. 39 and 40. The stud can be built up from a channel 63 with uniformly spaced holes in its flanges, to which the trough shaped sections 64 and 65 and wooden nailing strips 66 are secured by bolts 67. Since a stud in an outside wall of a building carries a greater load on the side which faces the inside of the building, this side can be reinforced by providing two trough shaped sections 65, or even more if necessary, at one side of the stud. A smaller number will be sufficient for the other side unless the stud is symmetrically loaded. The wooden nailing strips can be omitted if the construction adopted is such as to not require nailing to the studs.

It is apparent that a stud such as shown in the preceding figures could be used as a joist where the span and load are relatively small. If the nailing strips are not needed for the attachment to floor or ceiling, the channel and trough shaped members may be assembled with the troughs curved inwardly as shown in Fig. 38 to form a joist.

Structures made in accordance with this invention can be readily fireproofed. Referring to Fig. 41, a truss 68, which forms a part of a system of joists for supporting a floor 69, is surrounded by a blanket of mineral wool 70, or other suitable fireproof, heat insulating material. This blanket is held in position around the truss by a plurality of thin sheets of metal 71 which are pierced with holes to facilitate their attachment to the truss by bolts 72. A few sizes of sheets 71 will adapt the system to structures of any size by overlapping the sheets.

The structural units of this invention can be combined in various manners to produce structures of great diversity of form and use, and of any load carrying capacity from the lightest to the heaviest. Splices between units for the chords of trusses are readily made by overlapping two members and joining them by bolts, or by bolting the members to be joined to suitable splice plates. It is, of course, essential that the bolt holes in the members be uniformly and accurately spaced so that the bolt holes will coincide when overlapped. Ordinarily the units for the chords will be made in fairly short standardized lengths which can be spliced to form structures of any desired dimensions.

If at any time a structure so assembled is no longer needed, the bolts or rivets which hold it together can be removed and the individual elements of which it is composed can all be salvaged for subsequent use. While either bolts or rivets can be used to hold the units together, the use of bolts is generally to be preferred since they permit ready assembly without the use of the equipment needed for riveting. Furthermore, when bolts are used, the structure can be more readily disassembled if this should ever become necessary.

This feature is of particular advantage for temporary structures such as are frequently needed in connection with military operations. The structural units, being individually of relatively small size and of light weight are readily transportable over rough terrain, and can be quickly assembled to form observation towers, or frameworks for hangars, garages, barracks, warehouses, and the like. When these have served their purpose they can be readily disassembled and removed to another scene of action. Light weight bridges can be assembled on the banks of a stream, counterweighted on the land end and rolled out to cross the stream or to meet and connect with a similar section from the opposite bank. Once contact is established, the bridge can be strengthened and reinforced by bolting on additional elements until it is capable of supporting the weight of troops, supply trucks, and artillery.

Having thus described my invention, I claim:

1. In a structural system having standardized parts removably bolted together and providing variable webs and variable chords to take the place of wood and steel joists, steel I-beams, plate and box girders, trusses, columns, posts, and the like, a chord comprising a plurality of transversely nested continuously curved sheets of metal in substantially continuous contact with one another and having a plurality of registering holes distributed along the section for bolting the sheets together and securing other structural members thereto at selected positions.

2. In a structural system having standardized parts removably bolted together and providing variable webs and variable chords to take the place of wood and steel joists, steel I-beams, plate and box girders, trusses, columns, posts, and the like, a section comprising a plurality of sheet metal members curved complementary to one another to provide an open arcuate shape and nested together by transverse movement each of said members having a series of holes therein located to register with those in the other respective members nested therewith and means passing through registering holes in said members and securing said members together to provide a laminated unit of substantial strength and in which the laminations are in substantially continuous contact with one another.

3. A structural unit, comprising a plurality of nested strips of material of substantially uniform thickness bent into continuously curved cross section providing an open arcuate shape for nesting by transverse movement and adapted to resist buckling under the action of longitudinal compressive forces and provided with holes spaced uniformly in the direction of their length, said strips constituting laminations bolted together in substantially continuous contact with one another and being adapted to be connected to like units for building up beams, girders, columns, posts and the like.

4. A metal frame for structural systems to take the place of wood and steel joists, steel I-beams, plate and box girders, trusses, columns, posts, and the like, and having standardized parts removably bolted together and providing variable webs and variable chords, said parts comprising sheet metal members formed transversely into curved cross section to resist longitudinal compressive forces, and having accurately and uniformly spaced bolt holes distributed throughout the length for selectively securing the members together in balanced relation, only a part of the holes being used for any one structure, and certain of said parts being of continuously curved cross section providing an open arcuate shape with like parts nested by transverse movement in the locations requiring strengthening to provide curved laminations in substantilly continuous contact with one another.

RUDOLPH B. HARTMAN.